(No Model.) 6 Sheets—Sheet 1.

F. E. FREY.
BRICK OR TILE CUTTING MACHINE.

No. 421,691. Patented Feb. 18, 1890.

WITNESSES
F. L. Durand
Wm Musser

INVENTOR
Frederick E. Frey.
by A. G. Heylmun
Attorney (No Model.)    F. E. FREY.    6 Sheets—Sheet 2.
BRICK OR TILE CUTTING MACHINE.

No. 421,691.    Patented Feb. 18, 1890.

WITNESSES
F. L. Ourand
Wm Musser

INVENTOR
Frederick E. Frey
by A. G. Heufman
Attorney.

(No Model.) 6 Sheets—Sheet 3.
F. E. FREY.
BRICK OR TILE CUTTING MACHINE.
No. 421,691. Patented Feb. 18, 1890.
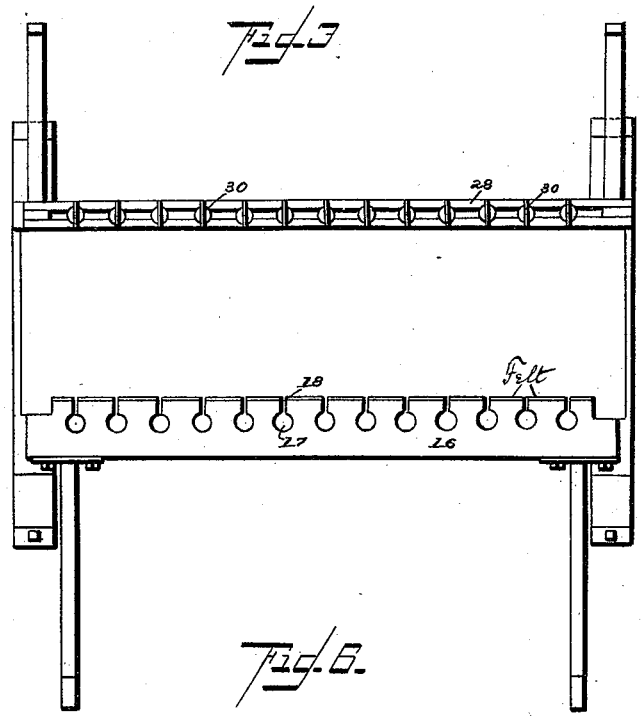
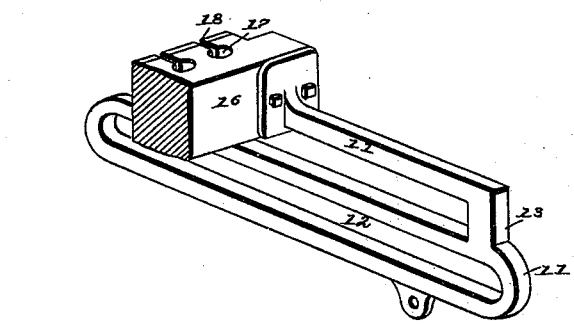
WITNESSES
F. L. Durand
Wm Musser
INVENTOR
Frederick E. Frey
by A. G. Hufman
Attorney (No Model.) 6 Sheets—Sheet 4.

F. E. FREY.
BRICK OR TILE CUTTING MACHINE.

No. 421,691. Patented Feb. 18, 1890.

WITNESSES
P. L. Ourand
Wm Musser

INVENTOR
Frederick E. Frey.
by A. G. Heyfman
Attorney (No Model.) 6 Sheets—Sheet 5.
F. E. FREY.
BRICK OR TILE CUTTING MACHINE.
No. 421,691. Patented Feb. 18, 1890.
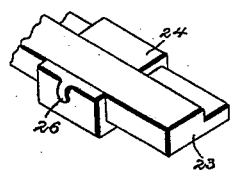
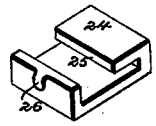
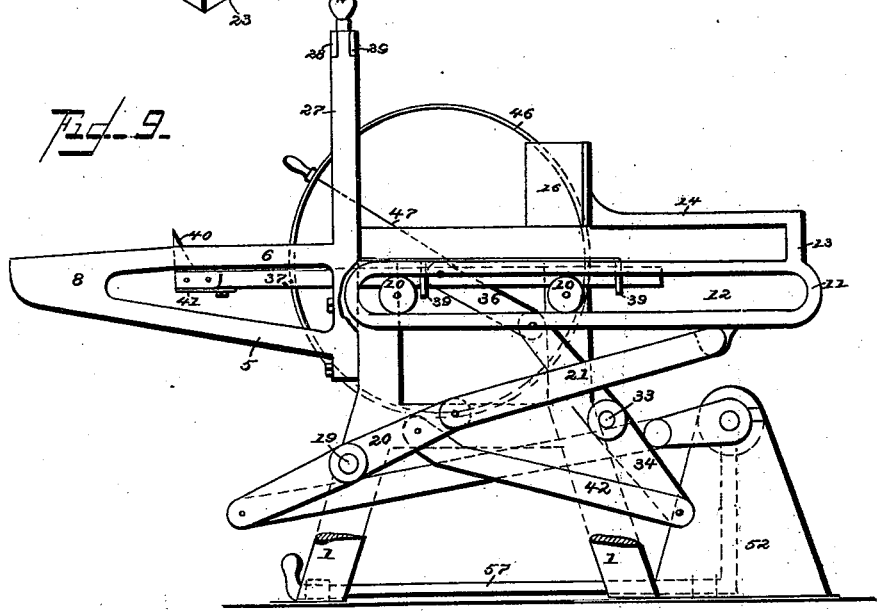
WITNESSES
F. L. Ourand
Wm. Musser
INVENTOR
Frederick E. Frey.
by A. G. Heyman
Attorney (No Model.)  
6 Sheets—Sheet 6.

F. E. FREY.
BRICK OR TILE CUTTING MACHINE.

No. 421,691. Patented Feb. 18, 1890.

*Fig. 10.*

WITNESSES  
F. L. Durand  
Wm Mussell

INVENTOR  
Frederick E. Frey.  
by A. G. Heyjmein  
*Attorney*

UNITED STATES PATENT OFFICE.

FREDERICK E. FREY, OF BUCYRUS, OHIO, ASSIGNOR TO THE FREY-SHECKLER COMPANY, OF SAME PLACE.

BRICK OR TILE CUTTING MACHINE.

SPECIFICATION forming part of Letters Patent No. 421,691, dated February 18, 1890.

Application filed May 18, 1889. Serial No. 311,268. (No model.)

*To all whom it may concern:*

Be it known that I, FREDERICK E. FREY, a citizen of the United States of America, residing at Bucyrus, in the county of Crawford and State of Ohio, have invented certain new and useful Improvements in Cutting-Tables for Brick or Tile Machines, of which the following is a specification.

My invention has relation to improvements in tile-tables and the cutting mechanism associated therewith, whereby the form or slab of clay as it may be delivered from the machine is severed into determined sizes and delivered from the table to the carrier.

The object is to simplify and improve existing devices or mechanism used for the purpose, and this I accomplish by means of the mechanisms and devices illustrated in the accompanying drawings, wherein—

Figures 1, 8:
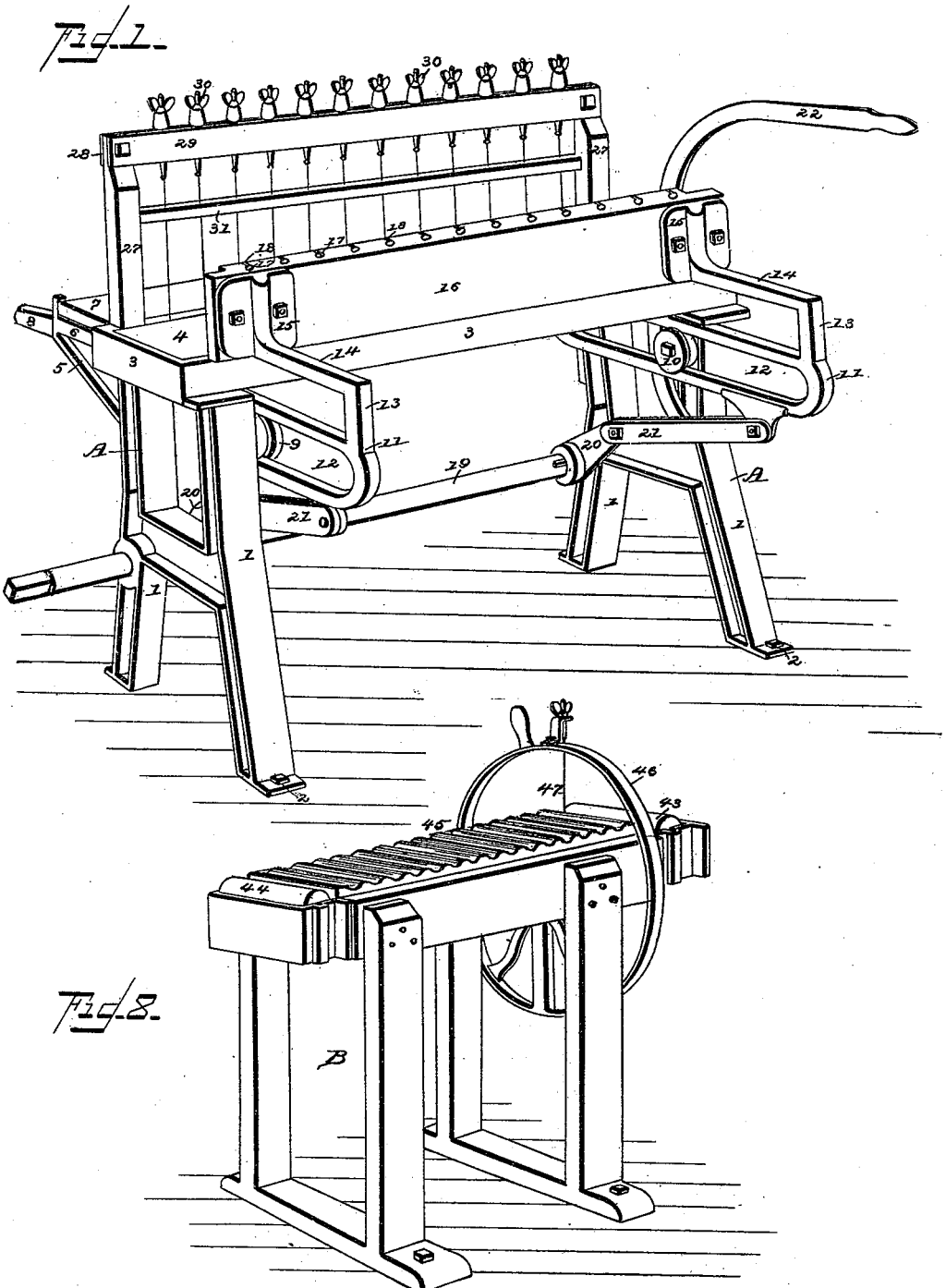
Figure 2:
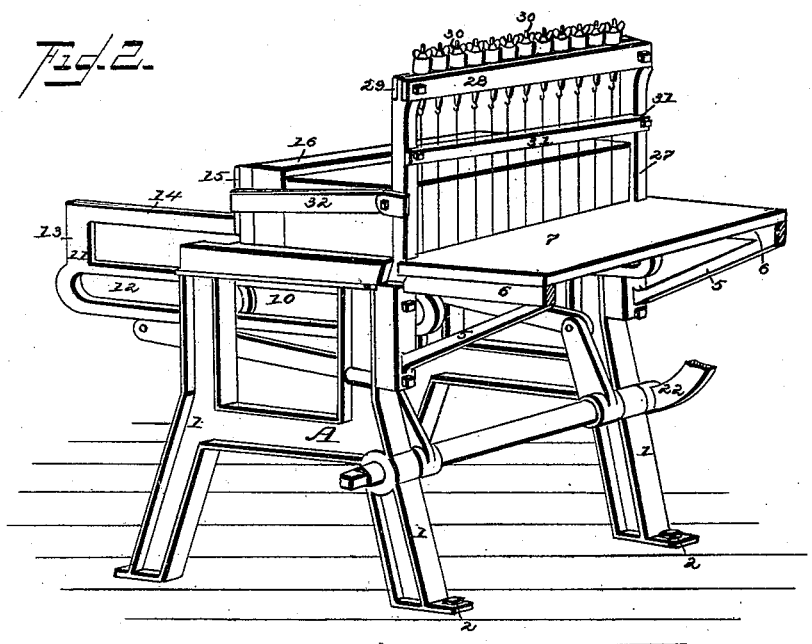
Figure 5:
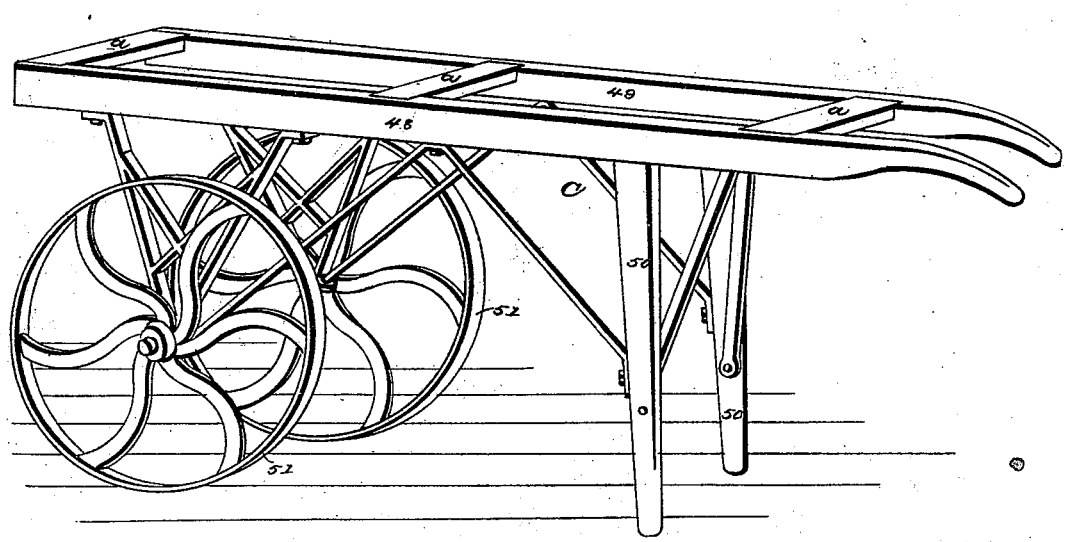
Figure 4:
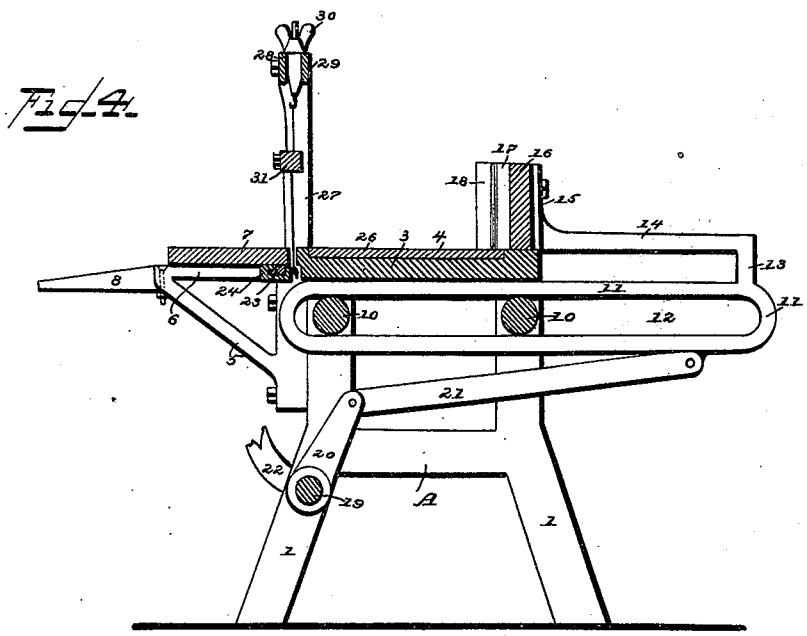
Figure 11:
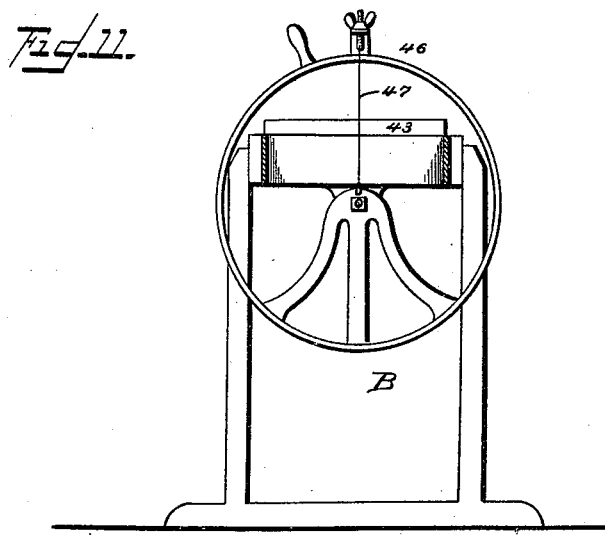

Figure 1 is a perspective of my improved tile-table and cutting mechanism. Fig. 2 is a perspective taken in reverse from that shown in Fig. 1. Fig. 3 is a top view of the machine. Fig. 4 is a traverse central section of the machine. Fig. 5 is a perspective of the carrying-truck. Fig. 6 is a detail of one of the push-bar frames with a section of the push-bar. Fig. 7 is a perspective of one of the adjustable hook-blocks on the bar. Fig. 8 is a perspective of the slab-receiving table, showing the corrugated bed-plate and slab-cutting device. Fig. 9 is a side view, in elevation of the machine, showing the machine-power applied, and showing the sliding push-rods with the hinged angle-pieces. Fig. 10 is a rear view, in elevation, showing the shaft and clutch mechanism applied to operate the machine. Fig. 11 is a transverse section of the slab-receiving table, showing the cutting-wheel with wire.

Referring to the drawings, A designates the supporting-frame of the cutting-table, which consists of a substantial structure having legs 1, the feet of which may be bolted to the floor, as seen at 2. On the top of the cutting-table is secured a frame 3, on which is laid a platen 4, on which the slab of clay lies at the time the cutting mechanism is brought into operation. From the side of each side frame is projected an arm 5, that part nearest the cutting-table having its upper surface arranged level, as at 6, to receive a platen 7, on which the cut forms are pushed by the push-bar after being severed. The outer section of the arm 5 is arranged with its upper edge or surface on a slight incline, as seen at 8, in order that when the platen 7 is pushed off the part 6 onto the part 8 it will be shoved on the projecting end of the truck, which is on a level with the parts 6, and the platen with its load of forms will not be disturbed when the truck is run back from the machine.

On the inner face of each end frame are journaled two flanged rollers 9 10, on which are mounted the race-frames of the push-bar, substantially as seen in the drawings. The push-bar frames consist of a metal frame 11, arranged horizontally and formed with a race or way 12, which runs on the bearings or rollers 9 10 under the bed or platen of the table. From the end of the push-bar frames is projected a post 13, from the upper end of which is projected an arm 14, terminating in a plate 15, to which the ends of the push-bar are bolted. The push-bar 16 consists of a substantial bar of about the height necessary to reach to the upper edge of the forms run on the platen, and has formed in it a number of vertical holes 17, from which lead vertical slots 18, through which the cutting-wires pass when the forms are being severed.

The face of the push-bar is faced with a covering of Spanish felt and cut to register with the wire-slits, the holes at the end of the slit serving the means through which the clay retained on the wires drops. By this construction of the push-bar it is operated by a positive regular movement, otherwise it requires a jerk movement to clean the wires and send the clay through between them.

Mounted on the frame of the table is a shaft 19, on which are fixed the arms 20, the outer ends of which are jointed to pull-bars 21, having their outer ends in turn jointed to the push-bar frames, substantially as shown. On the end of the shaft 19 is fixed a lever 22, which serves to reciprocate the push-bar and brings that element or part against the slab or form and eventuates in cutting the slab into the desired forms through the cutting-wires.

Across the cutting-table, below the platen, is fixed a flanged bar 23, on which are arranged the ajustable hook-blocks 24. These hook-blocks 24 have a flanged groove 25 formed in them, which takes the flanged bar 23, and they may be slid along on the bar, as desired. On the side of the hook-plates is a hook 26, to which the lower end of the cutting-wire is attached.

Projected from the frame of the table are two vertical posts 27, having secured to their upper ends or heads two parallel bars 28 29, between which are arranged the adjusting-screw 30, to the lower ends of which the cutting-wires are connected. As it is essential to have the cutting-wires as short as possible to escape springing or bending from verticality, I fix across the cutting-wire frame a bar 31, having a series of small holes in it, through which the cutting-wires are passed. On one of the posts 27 is a stop and guide-bar 32, which stops the further movement of the form in that direction, and the end face of the push-bar may slide against this bar.

To provide the mechanism for pushing the loaded platens from the supports onto a receiving-table or other vehicle, I mount a shaft 33 in the frame of the cutting-table, and on this shaft fix a lever-arm 34, arranged preferably at one end of the shaft, and at the opposite end of the shaft is fixed an arm 35, which is identical in form and dimensions to the upper limb of the lever-arm 34. To the upper ends of these arms 34 and 35, respectively, are attached connecting-rods 36, the upper ends of which are jointed or pivotally connected to two sliding rods 37 38, arranged on supports 39 under the table. On the ends of the sliding rods 37 38 are angle-pieces 40, hinged thereto and held against a rigid shoulder on the said rods, so as to turn up at right angles to the bars, substantially as shown in the drawings.

The angle-pieces 40 may be provided with springs 41 to snap them up and hold them in upright relation to the sliding bars.

It will be perceived from the foregoing that when a platen is placed on top of the angle-pieces or behind them they will be depressed or turned down, and that when the sliding rods are run back toward the cutting-wires and beyond the edge of the platen they will snap upward and assume the position requisite to push the platen away from the wires and onto the carrying-vehicle. To the lower limb of the lever-arm 34 is pivoted one end of a connecting-rod 42, having the other end pivotally connected to one of the arms 20, below its connection to the pull-bar 21. It will be perceived that by connecting the rod 42 in the manner shown and described a reverse motion is given to the sliding rods 37 38 from that of the push-bar 16, so that as the sliding rods move back the push-bar moves forward, the push-bar shoving the slab of clay through the cutting-wires, while the sliding rods are traveling in opposite direction to bring the angle-pieces behind the platen to push it out of the way for the next slab.

B designates the intermediate table arranged between the delivery end of the tile or brick machine and the cutting-table. This table B is of the usual construction so far as supporting means is concerned, and has mounted on its end rollers 43 44, the former of which runs with its lower part in a pan (not shown) containing a lubricating material such as is generally used for such purposes. On the table B, between the end rollers, is secured a bed-plate 45, which consists of a corrugated metal plate well polished. This construction of the table dispenses with the expensive construction heretofore in use, and has the advantage of providing a table that need not be cleaned so often and so much as the roller-table. The corrugations are preferably arranged crosswise or transversely to the length of the table, as thus they better retain the water or oil deposited by the slab as it is carried along the table. As the slab of clay is delivered regularly from the machine on the intermediate table, and from thence to the cutting-table, it is necessary to sever from the slab a length or block of the length which will make up a multiple of the forms to be cut on the cutting-table. To do this I mount a wheel 46 on a bearing on the table B and arrange it to swing on its axis in a line registering between the end of the metal bed and the end roller of the table. A cutting-wire 47 is stretched across the wheel, and by means of a handle the wheel is turned and the wire severs the slab at the point desired.

C designates the truck. This consists of two rails 48 49, connected by cross-pieces and formed with handles to pull and push the truck by, and having forward legs 50, properly braced, the whole being mounted on wheels 51, arranged near the middle of the truck. On the upper face of the rails of the truck are secured polished-metal straps $a$, which permit the platens to move readily over the surface. The rear ends of the rails of the truck are projected and formed to set between the projecting supports on the machine, and with their upper faces on a line with the level part of the support, so that the platens may be pushed on the truck without jar or other disturbance.

The platens on the cutting-table may be made of wood smoothed on its upper surface, or it may be covered with a polished sheet of metal—brass, copper, or steel.

In operation the empty platen is laid on the supports close up to the cutting-wires to receive the slab of clay when pushed through the cutting-wires. The operator stands by the machine, convenient to the lever which operates the cutting-table mechanism and to the cutting-wheel of the intermediate table B. Observing the progress of the slab of clay from the machine until it has reached the desired length, the operator turns the cutting-wheel, which severs the slab, which is pushed onward onto the cutting-table, where, having reached the limit, the lever of the cutting-table is moved and the push-bar shoves the slab against the cutting-wires and through them onto the loose platen arranged, as stated, to receive them. The slits in the push-bar permit the bar to move with its face past and beyond the line of cutting-wires, and so push the slab over on the loose platen, where it may be removed or be pushed by the next moving platen onto the truck. When the desired number of laden platens have been pushed on the truck, the truck is wheeled away and the bricks disposed of as required.

As described hereinbefore, the mechanism of the table is adapted to be operated by the hand-lever on the shaft, and for light forms or in some other instances this construction and means for operating will serve the purposes intended; but in some instances—such as where the work is heavy or machine-power is desired—the following mechanism has been devised by me to propel the mechanism of the cutting-table: Mounted on standards or other suitable supports 52 is a shaft 53, having proper connection with the gearing of the brick or tile machine, (not shown,) or it may have been provided with a band-pulley, as 54, and this pulley connected by belting to a driving-pulley. (Not shown.) On the shaft 53 is a sliding clutch 55, having a shifting-lever 56, operated by a spring-treadle 57, arranged substantially as shown. The sliding clutch 55 engages with a clutch-piece 58, fixed on a shaft 59, mounted in bearings, substantially as shown. On the clutch-piece 58 is an arm 60, which serves to throw the clutch out of engagement at each revolution by striking against the shifting-lever. Whenever the foot is placed on the treadle the clutch engages and the shaft is given one revolution, and no more, until the clutches are again engaged. But one revolution is required to a single complete movement of the table mechanism. On the shaft 59 is a crank-arm 61, which is jointed to a pitman 62 on the shaft 19, mounted in the table-frame, which connection is identical with that of the lever 22 and moves the table mechanism accordingly.

Having thus described my improved machine, I proceed to particularly point out and distinctly claim what I believe to be my invention, as follows:

1. In a cutting-table for a tile-machine, a table provided with rollers under the platen of the table, a push-bar mounted on said rollers and formed with a head having vertical holes therein and wire-slits leading therefrom through its face, a lever to reciprocate the push-bar, and the cutting-wires, substantially as described, and for the purpose specified.

2. In a cutting-table for a tile-machine, a flanged bar arranged across the table below the platen thereof, adjustable blocks having hooks to engage the ends of the cutting-wires arranged on said flanged bar, and a frame mounted on the cutting-table, having screw-clamps arranged thereon, and the cutting-wires on the screw-clamps, and hook-blocks, substantially as described.

3. In combination with a cutting-table of a tile-machine, a push-bar arranged to reciprocate over the platen of the table and formed with vertical holes having wire-slits leading through its face to the vertical holes, substantially as and for the purpose specified.

4. The combination, in a cutting-table for a brick or tile machine, of rollers mounted on the frame of the table, a push-bar consisting of race-frames arranged to travel on said rollers, arms projected parallel with said frames, a push-bar fixed on said last-named arms, said push-bar being formed with vertical holes and slits leading therefrom, and mechanism substantially as described, and for the purpose specified.

5. In a cutting-table for a brick or tile machine, a push-bar arranged to reciprocate over the face of the platen of the table and formed with vertical holes having wire-slits leading therefrom and having its face covered with a felt material, substantially as and for the purpose specified.

6. In a cutting-table for a tile or brick machine, the table B, provided with a corrugated polished-metal bed-plate, substantially as described.

7. The table B, provided with end rollers, and a corrugated-metal bed-plate arranged between the end rollers, substantially as described.

8. The table B, provided with end rollers, a corrugated metal bed arranged between the rollers, and a cutting-wheel pivotally mounted on the table with the cutting-wire between the end of the bed-plate and the end roller, substantially as described.

9. The combination of the reciprocating push-bar, the sliding rods provided with angle-pieces on their outer ends, and mechanism to move the push-bar and sliding rods in opposite directions, all substantially as described.

10. The combination of the reciprocating push-bar, the sliding rods provided with angle-pieces on their ends, a shaft mounted on the frame of the cutting-table, levers connected with said shaft and to the push-bar, a second shaft on the frame of the cutting-table, levers on said shaft, and connecting-rods connecting the last-named shaft to the sliding rods, and connecting-rods from one set of the levers to the other, whereby the push-bar and the sliding rods are moved in opposite directions to each other, substantially as and for the purpose specified.

11. The combination, in a brick or tile machine, of a push-bar to push the slab of clay through the cutting-wires onto a platen, sliding rods to push the loaded platen onto a support, and mechanism, substantially as described, for moving the push-bar and sliding rods in opposite directions, substantially as specified.

12. In a cutting-table for a brick or tile machine, the sliding rods to push the loaded platens from the cutting-table, said rods being arranged under the table and provided with angle-pieces at their pushing ends, and mechanism, substantially as described, for reciprocating the said sliding rods, substantially as specified.

In witness whereof I have hereunto set my hand in the presence of two attesting witnesses.

FREDERICK E. FREY.

Attest:
W. C. LEMERT,
J. A. FREY.